(12) United States Patent
Peng

(10) Patent No.: US 12,390,996 B2
(45) Date of Patent: Aug. 19, 2025

(54) DEVICE AND METHOD FOR KEEPING LIQUID LEVEL CONSTANT DURING 3D PRINTING

(71) Applicant: BMF NANO MATERIAL TECHNOLOGY CO., LTD, Shenzhen (CN)

(72) Inventor: Chong Peng, Shenzhen (CN)

(73) Assignee: BMF NANO MATERIAL TECHNOLOGY CO., LTD, Shenzhen (CN)

( * ) Notice: Subject to any disclaimer, the term of this patent is extended or adjusted under 35 U.S.C. 154(b) by 139 days.

(21) Appl. No.: 18/489,881

(22) Filed: Oct. 19, 2023

(65) Prior Publication Data
US 2024/0042688 A1 Feb. 8, 2024

Related U.S. Application Data

(63) Continuation of application No. PCT/CN2021/106459, filed on Jul. 15, 2021.

(51) Int. Cl.
*B33Y 30/00* (2015.01)
*B29C 64/124* (2017.01)
(Continued)

(52) U.S. Cl.
CPC .......... *B29C 64/232* (2017.08); *B29C 64/124* (2017.08); *B29C 64/245* (2017.08); *B33Y 30/00* (2014.12)

(58) Field of Classification Search
None
See application file for complete search history.

(56) References Cited

U.S. PATENT DOCUMENTS

2020/0282640 A1    9/2020  Hendrik

FOREIGN PATENT DOCUMENTS

| CN | 104527070 A | 4/2015 |
| CN | 105415681 A | 3/2016 |

(Continued)

OTHER PUBLICATIONS

International Search Report of PCT Patent Application No. PCT/CN2021/106459 issued on Sep. 16, 2021.
(Continued)

*Primary Examiner* — Yung-Sheng M Tsui
(74) *Attorney, Agent, or Firm* — Andrew C. Cheng

(57) ABSTRACT

A device for keeping the liquid level constant during 3D printing includes a liquid bath for containing printing liquid, a printing platform for carrying a printed sample, a liquid level counterbalance inserted into the liquid bath, and a link mechanism connected with the printing platform and the liquid level counterbalance respectively for driving the liquid level counterbalance to ascend when the printing platform descends. The printing platform is inserted into the liquid bath and driven by a lifting device to ascend or descend. The printing platform and the liquid level counterbalance are in a relationship that a volume of a portion of the printing platform immersed into the printing liquid due to descending of the printing platform is equal to a volume of a portion of the liquid level counterbalance leaving the printing liquid due to rising of the liquid level counterbalance caused by descending of the printing platform.

8 Claims, 2 Drawing Sheets

(a)

(b)

(51) Int. Cl.
*B29C 64/232* (2017.01)
*B29C 64/245* (2017.01)

(56) References Cited

FOREIGN PATENT DOCUMENTS

| CN | 106881863 A | * | 6/2017 |
|---|---|---|---|
| CN | 108099186 A | | 6/2018 |
| CN | 109927286 A | | 6/2019 |
| CN | 110239099 A | * | 9/2019 |
| CN | 111113893 A | | 5/2020 |
| JP | H11342541 A | * | 6/1998 |
| JP | 2001198984 A | | 7/2001 |
| JP | 2010046800 A | | 3/2010 |

OTHER PUBLICATIONS

CN Search Report of CN application No. 2021107999399 issued on Nov. 28, 2022.

* cited by examiner

DEVICE AND METHOD FOR KEEPING LIQUID LEVEL CONSTANT DURING 3D PRINTING

FIELD

The application belongs to the technical field of 3D printing, and particularly relates to accuracy control during high-accuracy photocuring 3D printing.

BACKGROUND

At present, during high-accuracy photocuring 3D printing, an optical machine is generally disposed above a liquid bath, such that a thinner FEP film can be used, or even self-levelling can be used to allow a pattern to be projected onto photosensitive resin accurately to obtain a higher accuracy. By adopting the solution that the photocuring 3D printer is located above the liquid bath, a printing platform will descend gradually with the proceeding of printing and will be immersed in the liquid bath more and more deeply. As shown in FIG. 1(a), at the beginning of printing, the volume of the liquid that the sample 301 displaces is small due to the small size of the sample 301 submerged inside the printing liquid, so the FEP film or the liquid level 501 is relatively low. With the proceeding of printing, as shown in FIG. 1(b), the height of the printed sample 302 increases gradually, the support rod of the printing platform 2 will be immersed in the liquid bath 1 more and more deeply and the volume of the liquid that the printing platform 2 displaces increases gradually, leading to a rise of the height of the FEP film or the liquid level 502 after a time period of printing, so the FEP film or the liquid level 501 which is located on the focal plane at the beginning of printing deviates from the focal plane, which in turn leads to a fuzzy projected pattern, thus greatly reducing the accuracy of prints within an XY breadth; and the continuous rise of the liquid level increases errors of the prints in the Z-direction.

SUMMARY

The technical issue to be settled by the invention is to provide a device and method for keeping the liquid level constant during 3D printing to solve the problem of errors of prints in the Z-direction caused by changes of the liquid level during 3D printing in the prior art.

In one aspect, the present invention provides a device for keeping a liquid level constant during 3D printing, comprising:
a liquid bath used for containing printing liquid;
a printing platform used for carrying a printed sample, the printing platform being inserted into the liquid bath and driven by a printing lifting device to ascend or descend;
a liquid level counterbalance inserted into the liquid bath; and
a link mechanism connected with the printing platform and the liquid level counterbalance respectively and capable of driving the liquid level counterbalance to ascend when the printing platform descends, wherein the printing platform and the liquid level counterbalance are in a relationship that a volume of a portion of the printing platform immersed into the printing liquid due to descending of the printing platform is equal to a volume of a portion of the liquid level counterbalance leaving the printing liquid due to rising of the liquid level counterbalance caused by descending of the printing platform.

Preferably, the link mechanism comprises:
a synchronous belt;
a synchronous belt mounting assembly;
a counterbalance connecting piece; and
a printing platform connecting piece; wherein the synchronous belt is mounted on the synchronous belt mounting assembly, and when one side of the synchronous belt moves in a first direction, the other side of the synchronous belt moves in a second direction opposite to the first direction; and one side of the synchronous belt is connected with the liquid level counterbalance through the counterbalance connecting piece, and the other side of the synchronous belt is connected with the printing platform through the printing platform connecting piece.

The synchronous belt mounting assembly comprises an upper fixed pulley and a lower fixed pulley, and the counterbalance connecting piece and the printing platform connecting piece are both connecting rods.

The printing platform comprises a board and a lifting section vertically fixed on a side of the board; the lifting section and the liquid level counterbalance are both cylindrical or pillar shaped.

Preferably, a cross-sectional area of the lifting section is $S_1$, a cross-sectional area of the liquid level counterbalance is $S_2$, a moving velocity of one side of the synchronous belt (9) is $v_1$, and a moving velocity of the other side of the synchronous belt is $v_2$; and $S_1*v_1=-S_2*v_2$.

Preferably, the device for keeping the liquid level constant during 3D printing further comprises a counterbalance lifting rail, and a slider is disposed on the counterbalance lifting rail and is connected with the counterbalance connecting piece.

Preferably, a counterbalance disconnecting knob is disposed at a joint of the slider and the counterbalance connecting piece and is used for disconnecting the counterbalance connecting piece and the synchronous belt.

Preferably, the counterbalance connecting piece is connected with the liquid level counterbalance through a counterbalance assembly and disassembly knob.

Preferably, the device for keeping the liquid level constant during 3D printing further comprises a printing platform Z-shaft support plate and a printing platform Z-shaft, the printing platform is connected to the printing platform Z-shaft support plate through the printing platform Z-shaft; and a printing platform Rx levelling mechanism and a printing platform Ry levelling mechanism are fixed on a slider of the printing platform Z-shaft, and the printing platform Z-shaft is used for accurately controlling a position of the printing platform.

In another aspect, the present invention provides a method for keeping the liquid level constant during 3D printing. The method comprises:
providing a liquid level counterbalance, and inserting the liquid level counterbalance into a liquid bath; and
providing a link mechanism and connecting the link mechanism with a printing platform and the liquid level counterbalance, such that the link mechanism is able to drive the liquid level counterbalance to ascend when the printing platform descends, wherein a volume of the printing platform and a volume of the liquid level counterbalance are in a corresponding relationship that the volume of the printing platform descending into printing liquid is equal to the volume of the liquid level counterbalance ascending out of the printing liquid.

The invention has the following beneficial effects:

The volume of printing liquid is balanced by means of the volume of the counterbalance to ensure that the liquid level is away kept constant during the 3D printing process no matter whether the printing platform ascends or descends, so:
1. The liquid level will not deviate from the focal plane during high-accuracy 3D printing (especially high-accuracy 3D printing with a focal depth within 10 μm), thus ensuring the accuracy of prints in an XY breadth;
2. The liquid level will not change during the printing process, thus ensuring the accuracy of the prints in the Z-direction.

BRIEF DESCRIPTION OF THE DRAWINGS

The technical solution of the application will be further described below in conjunction with accompanying drawings and embodiments.

Figure 1:
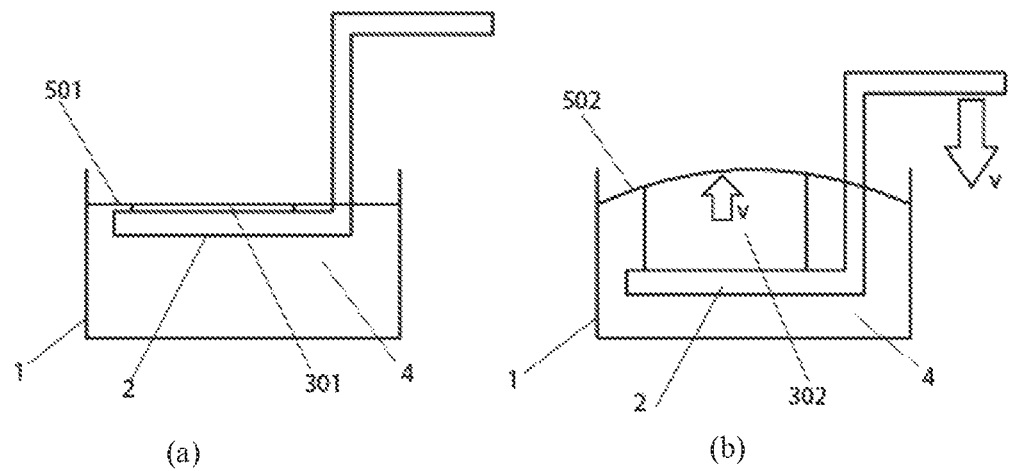
FIGS. 1(a) and 1(b) illustrate change of the position of a printing platform and the liquid level before and after a sample is printed by a 3D printer in the prior art.

REFERENCE SIGNS IN THE FIGURES 1, liquid bath; 2, printing platform; 4, printing liquid; 6, liquid level counterbalance; 7, upper; 8, lower fixed pulley; 9, synchronous belt; 10, counterbalance connecting piece; 11, printing platform connecting piece; 16, counterbalance disconnecting knob; 17, counterbalance lifting rail; 18, pulley support rod; 20, counterbalance assembly and disassembly knob; 21, board; 22, lifting section; 23, printing platform Ry levelling mechanism; 24, Z-shaft support plate; 25, printing platform Rx levelling mechanism; 26, printing platform Z-shaft; 27, printing platform assembly and disassembly knob; 301, sample at the beginning of printing; 302, sample after a period of time of printing; 501, FEP film or liquid level at the beginning of printing; 502, FEP film or liquid level after a period of time of printing.

DESCRIPTION OF THE EMBODIMENTS

It should be pointed out that the embodiments of the application and the features in the embodiments can be combined without conflicts.

In the description of the application, it should be understood that terms such as "centre", "lengthwise", "crosswise", "upper", "lower", "front", "back", "left", "right", "vertical", "horizontal", "top", "bottom", "inner" and "outer", are used to indicate directional or positional relationships based on the accompanying drawings merely for the purpose of facilitating and simplifying the description of the application, do not indicate or imply that devices or elements referred to must be in a direction, or be constructed and operated in a specific direction, and thus, should not be construed as limiting the protection scope of the invention. In addition, terms such as "first" and "second" are merely for a purpose of description, and should not be construed as indicating or implying relative importance or implicitly indicating the number of technical features referred to. So, a feature defined by "first" or "second" may explicitly or implicitly indicate the inclusion of one or more said features. In the description of the invention, unless otherwise stated, "multiple" refers to two or more.

It should be noted that unless otherwise expressly stated and defined, terms such as "mount", "connect" and "link" in the description of the invention should be broadly understood. For example, "connect" may refer to fixed connection, detachable connection or integrated connection, or mechanical connection or electrical connection, or direct connection, indirect connection through an intermediate medium, or internal connection of two elements. Those skilled in the art can appreciate the specific meanings of these terms in the application as the case maybe.

The technical solution of the application will be described in detail below with reference to the accompanying drawings and embodiments.

This embodiment provides a device for keeping the liquid level constant during 3D printing. As shown in FIGS. 2(a) and 2(b), the device for keeping the liquid level constant during 3D printing comprises:

A liquid bath 1 used for containing printing liquid;

A printing platform 2 used for carrying a printed sample, the printing platform 2 being inserted into the liquid bath 1 and driven by a printing lifting device to ascend or descend;

A liquid level counterbalance 6 inserted into the liquid bath 1; and

A link mechanism connected with the printing platform 2 and the liquid level counterbalance 6 respectively and capable of driving the liquid level counterbalance 6 to ascend when the printing platform 2 descends. The volume of the printing platform 2 and the volume of the liquid level counterbalance 6 are in a corresponding relationship that the volume of the printing platform 2 being inserted into the printing liquid during descending is equal to the volume of the liquid level counterbalance 6 leaving the printing liquid due to ascending. That is, during the process of 3D printing, the increased volume of the liquid that the printing platform 2 displaces due to descending of the printing platform 2 is equal to the decreased volume of the liquid that the liquid level counterbalance 6 displaces due to ascending of the liquid level counterbalance 6.

According to the device for keeping the liquid level constant during 3D printing in the embodiment, as shown in FIGS. 2(a) and 2(b), during the 3D printing process, the printing platform 2 and the liquid level counterbalance 6 are in a relationship that a volume of a portion of the printing platform 2 immersed into the printing liquid 4 due to descending of the printing platform 2 is equal to a volume of a portion of the liquid level counterbalance 6 leaving the printing liquid 4 due to rising of the liquid level counterbalance 6 caused by descending of the printing platform 2, such that the liquid level can be always kept constant during the 3D printing process no matter whether the printing platform ascends or descends.

Figure 2:
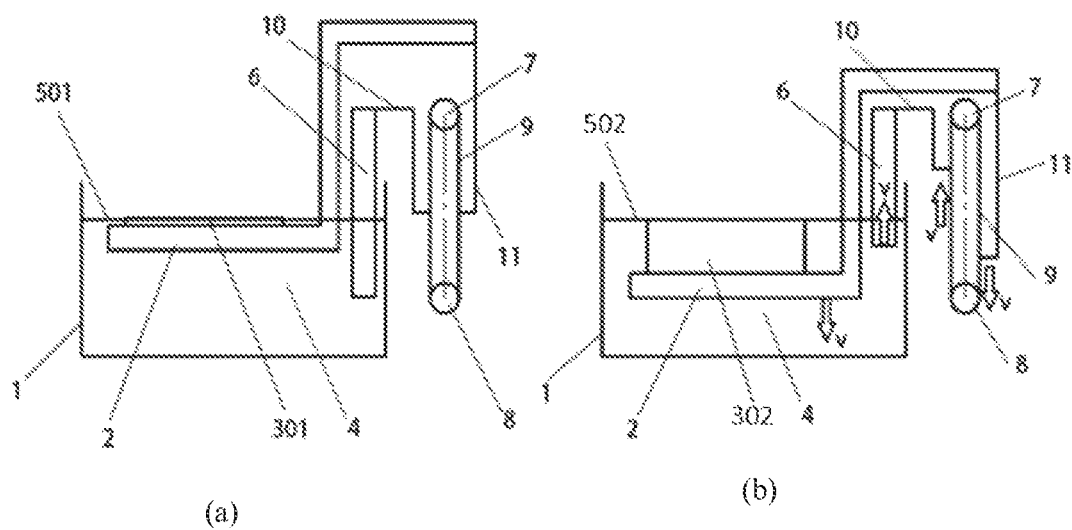
FIGS. 2(a) and 2(b) illustrates a device for keeping the liquid level constant during 3D printing according to an embodiment of the application.

Preferably, according to the device for keeping the liquid level constant during 3D printing in this embodiment, as shown in FIG. 2, the link mechanism of comprises:

A synchronous belt 9;

A synchronous belt mounting assembly;

A counterbalance connecting piece 10; and

A printing platform connecting piece 11.

Wherein, the synchronous belt 9 is mounted on the synchronous belt mounting assembly, and when one side of the synchronous belt 9 moves in a first direction, the other side of the synchronous belt 9 moves in a second direction opposite to the first direction; and one side of the synchronous belt 9 is connected with the liquid level counterbalance 6 through the counterbalance connecting piece 10, and the other side of the synchronous belt 9 is connected with the printing platform 2 through the printing platform connecting piece 11.

Preferably, according to the device for keeping the liquid level constant during 3D printing in this embodiment, as shown in FIG. 2, the synchronous belt mounting assembly comprises an upper 7 and a lower fixed pulley 8. The counterbalance connecting piece 10 and the printing platform connecting piece 11 are both connecting rods.

Figure 3:
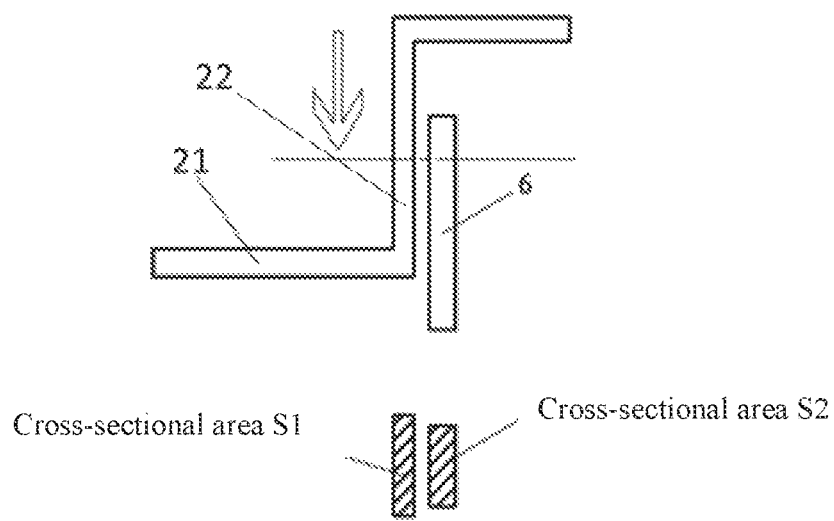
FIG. 3 is a structural view of the cross-section of a lifting section and the cross-section of a liquid level counterbalance according to an embodiment of the invention.

Preferably, the device for keeping the liquid level constant during 3D printing in this embodiment, as shown in FIG. 3, the printing platform 2 comprises a board 21 and a lifting section 22 vertically fixed on one side of the board 21.

The lifting section 22 and the liquid level counterbalance 6 are both cylindrical or pillar-shaped, such that the volume of the lifting section 22 per unit of height and the volume of the liquid level counterbalance 6 per unit of height can be calculated more easily, and linkage is facilitated. As shown in FIG. 3, the cross-sectional area of the lifting section 22 is $S_1$, the cross-sectional area of the liquid level counterbalance 6 is $S_2$, the moving velocity of one side of the synchronous belt 9 is $v_1$, and the moving velocity of the other side of the synchronous belt 9 is $v_2$; when $S_1*v_1=-S_2*v_2$, the volume of the printing platform 2 descending into the printing liquid is equal to the volume of the liquid level counterbalance 6 ascending out of the printing liquid.

Preferably, as shown in FIGS. 4(a) and 4(b), the device for keeping the liquid level constant during 3D printing in this embodiment further comprises a counterbalance lifting rail 17, wherein a slider 31 is disposed on the counterbalance lifting rail 17 and is connected with the counterbalance connecting piece 10. In this way, the ascending and descending stability and accuracy of the liquid level counterbalance 6 can be improved.

Preferably, according to the device for keeping the liquid level constant during 3D printing in this embodiment, as shown in FIGS. 4(a) and 4(b), a counterbalance disconnecting knob 6 is disposed at a joint of the slider and the counterbalance connecting piece 10 and is used for disconnecting the counterbalance connecting piece 10 and the synchronous belt 9. In this way, the problem that it is difficult to take the sample out of the printing platform 2 at the end of printing when the printing platform 2 descends to a lowest position and the liquid level counterbalance 6 ascends to a highest position is solved.

Preferably, according to the device for keeping the liquid level constant during 3D printing in this embodiment, as shown in FIGS. 4(a) and 4(b), the counterbalance connecting piece 10 is connected with the liquid level counterbalance 6 through a counterbalance assembly and disassembly knob 20. In this way, the liquid level counterbalance 6 can be disassembled; and when the liquid bath 1 is mounted, the liquid level counterbalance 6 can be assembled or disassembled according to the specific condition, thus making installation easy.

Preferably, as shown in FIGS. 4(a) and 4(b), the device for keeping the liquid level constant during 3D printing in this embodiment further comprises a printing platform Z-shaft support plate 24 and a printing platform Z-shaft 26, wherein the printing platform 2 is connected to the printing platform Z-shaft support plate 24 through the printing platform Z-shaft 26. A printing platform Rx levelling mechanism 25 and a printing platform Ry levelling mechanism 23 are fixed on a slider 32 of the printing platform Z-shaft 26.

The printing platform Rx levelling mechanism 25 is configured for adjusting the swing angle of the printing platform 2 in the X-axis direction. The printing platform Ry levelling mechanism 23 is configured for adjusting the swing angle of the printing platform 2 in the Y-axis direction. The printing platform Z-shaft 26 is used for accurately controlling the position of the printing platform 2.

Figure 4:
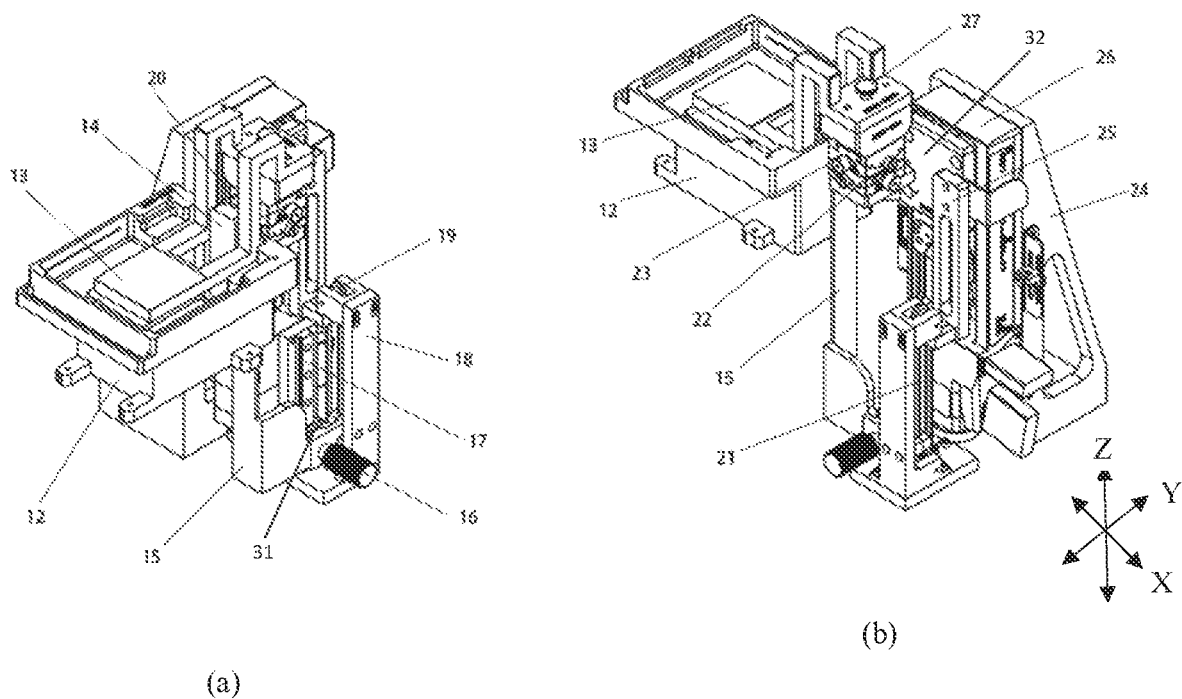
FIGS. 4(a) and 4(b) is a three-dimensional structural view of the device for keeping the liquid level constant during 3D printing according to one embodiment of the application.

Preferably, as shown in FIG. 4, the device for keeping the liquid level constant during 3D printing in this embodiment further comprises a pulley support rod 18 which is fixed with respect to the printing platform Z-shaft support plate 24, the upper and the lower fixed pulleys 7/8 (8 is hidden in FIGS. 4(a) and 4(b)) are disposed at the top and bottom of the pulley support rod 18 respectively, and the synchronous belt 9 is mounted between the two pulleys 7/8.

Preferably, according to the device for keeping the liquid level constant during 3D printing in this embodiment, as shown in FIGS. 4(a) and 4(b), the printing platform 2 is fixed on the printing platform Z-shaft 26 through a printing platform assembly and disassembly knob 27, such that the printing platform 2 can be assembled and disassembled.

This embodiment further provides a method for keeping the liquid level constant during 3D printing, comprising:

Providing a liquid level counterbalance 6, and inserting the liquid level counterbalance 6 into a liquid bath 1;

Providing a link mechanism, and connecting the link mechanism with the printing platform 2 and the liquid level counterbalance 6, such that the link mechanism is able to drive the liquid level counterbalance 6 to ascend when the printing platform 2 descends, wherein the volume of the printing platform 2 and the volume of the liquid level counterbalance 6 are in a corresponding relationship that the volume of the printing platform 2 descending into printing liquid is equal to the volume of the liquid level counterbalance 6 ascending out of the printing liquid.

The above ideal embodiments of the application are enlightenments, and with reference to the above description, relevant personnel can make various modifications and amendments without deviating from the scope of the technical concept of the application. The technical scope of the application is not limited to the above description in the specification, and should be defined according to the scope of the claims.

What is claimed is:

1. A device for keeping a liquid level constant during 3D printing, comprising:
   a liquid bath (1) used for containing printing liquid;
   a printing platform (2) used for carrying a printed sample, the printing platform (2) being inserted into the liquid bath (1) and driven by a printing lifting device to ascend or descend;
   a liquid level counterbalance (6) inserted into the liquid bath (1); and
   a link mechanism connected with the printing platform (2) and the liquid level counterbalance (6) respectively and capable of driving the liquid level counterbalance (6) to ascend when the printing platform (2) descends,
   wherein the link mechanism comprises
   a synchronous belt (9);
   a synchronous belt mounting assembly;
   a counterbalance connecting piece (10); and
   a printing platform connecting piece (11);
   wherein the synchronous belt (9) is mounted on the synchronous belt mounting assembly, and when one side of the synchronous belt (9) moves in a first direction, the other side of the synchronous belt (9)

moves in a second direction opposite to the first direction; and one side of the synchronous belt (9) is connected with the liquid level counterbalance (6) through the counterbalance connecting piece (10), and the other side of the synchronous belt (9) is connected with the printing platform (2) through the printing platform connecting piece (11), and wherein the synchronous belt mounting assembly comprises an upper fixed pulley (7) and a lower fixed pulley (8), and the counterbalance connecting piece (10) and the printing platform connecting piece (11) are both connecting rods;

wherein the printing platform (2) and the liquid level counterbalance (6) are in a relationship that a volume of a portion of the printing platform (2) immersed into the printing liquid due to descending of the printing platform (2) is equal to a volume of a portion of the liquid level counterbalance (6) leaving the printing liquid due to rising of the liquid level counterbalance (6) caused by descending of the printing platform (2).

2. The device for keeping the liquid level constant during 3D printing according to claim 1, wherein the printing platform (2) comprises a board (21) and a lifting section (22) vertically fixed on a side of the board (21);

the lifting section (22) and the liquid level counterbalance (6) are both cylindrical or pillar shaped.

3. The device for keeping the liquid level constant during 3D printing according to claim 2, wherein a cross-sectional area of the lifting section (22) is $S_1$, a cross-sectional area of the liquid level counterbalance (6) is $S_2$, a moving velocity of one side of the synchronous belt (9) is $v_1$, and a moving velocity of the other side of the synchronous belt (9) is $v_2$; and $S_1$, $S_2$, $v_1$ and $v_2$ satisfy the following relationship:

$$S_1 * v_1 = -S_2 * v_2.$$

4. The device for keeping the liquid level constant during 3D printing according to claim 1, wherein the device for keeping the liquid level constant during 3D printing further comprises a counterbalance lifting rail (17), and a slider is disposed on the counterbalance lifting rail (17) and is connected with the counterbalance connecting piece (10).

5. The device for keeping the liquid level constant during 3D printing according to claim 4, wherein a counterbalance disconnecting knob (6) is disposed at a joint of the slider and the counterbalance connecting piece (10) and is used for disconnecting the counterbalance connecting piece (10) and the synchronous belt (9).

6. The device for keeping the liquid level constant during 3D printing according to claim 5, wherein the counterbalance connecting piece (10) is connected with the liquid level counterbalance (6) through a counterbalance assembly and disassembly knob (20).

7. The device for keeping the liquid level constant during 3D printing according to claim 1, wherein the device for keeping the liquid level constant during 3D printing further comprises a printing platform Z-shaft support plate (24) and a printing platform Z-shaft (26), the printing platform (2) is connected to the printing platform Z-shaft support plate (24) through the printing platform Z-shaft (26); and a printing platform Rx levelling mechanism (25) and a printing platform Ry levelling mechanism (23) are fixed on a slider of the printing platform Z-shaft (26), and the printing platform Z-shaft (26) is used for accurately controlling a position of the printing platform (2).

8. A method for keeping the liquid level constant during 3D printing, comprising:

inserting a liquid level counterbalance (6) into a liquid bath (1) containing printing liquid; and connecting a link mechanism with a printing platform (2) and the liquid level counterbalance (6), such that the link mechanism is able to drive the liquid level counterbalance (6) to ascend when the printing platform (2) descends, wherein the printing platform (2) and the liquid level counterbalance (6) are in a relationship that a volume of a portion of the printing platform (2) immersed into the printing liquid due to descending of the printing platform (2) is equal to a volume of a portion of the liquid level counterbalance (6) leaving the printing liquid due to rising of the liquid level counterbalance (6) caused by descending of the printing platform (2), wherein the link mechanism comprises a synchronous belt (9);

a synchronous belt mounting assembly;

a counterbalance connecting piece (10); and a printing platform connecting piece (11);

wherein the synchronous belt (9) is mounted on the synchronous belt mounting assembly, and when one side of the synchronous belt (9) moves in a first direction, the other side of the synchronous belt (9) moves in a second direction opposite to the first direction; and one side of the synchronous belt (9) is connected with the liquid level counterbalance (6) through the counterbalance connecting piece (10), and the other side of the synchronous belt (9) is connected with the printing platform (2) through the printing platform connecting piece (11), and wherein the synchronous belt mounting assembly comprises an upper fixed pulley (7) and a lower fixed pulley (8), and the counterbalance connecting piece (10) and the printing platform connecting piece (11) are both connecting rods.

* * * * *